Patented Apr. 19, 1932

1,854,846

UNITED STATES PATENT OFFICE

OSCAR KNECHT AND THEODOR WIRTH, OF BASEL, SWITZERLAND, ASSIGNORS TO THE FIRM CHEMICAL WORKS FORMERLY SANDOZ, OF BASEL, SWITZERLAND

MONOAZO-DYESTUFFS AND THEIR MANUFACTURE

No Drawing. Application filed May 10, 1929, Serial No. 362,149, and in Germany May 26, 1928.

It is known that representatives of aminoarylsulphamides, in which both hydrogen atoms of the sulphamide group are substituted by identical or different aliphatic or aromatic residues, have been used for the manufacture of azo-dyestuffs. According to U. S. Patent No. 1,678,599 diazo compounds of aminoarylsulphamides of the above mentioned constitution, in which the amino group stands in ortho- or in meta-position to the sulphamide group, are combined with 2.3-hydroxynaphthoic acid arylides, whereby insoluble dyestuffs are produced.

In the U. S. Patents Nos. 1,429,781 and 1,429,782 soluble azo-dyestuffs are described, obtainable by combining with 2 amino-8-naphthol-6-sulphonic acid compounds or with 2-naphthylamine-8-sulphonic acids in an acid solution such diazotized 4-nitraniline-sulphamides, in which the sulphamide group is substituted in a similar manner by alkyl or aryl groups, furnishing on wool reddish-violet to blue tints of good properties of fastness. The U. S. Patent No. 921,239 describes the corresponding azo-dyestuffs obtained by using 4-nitraniline sulphonic acid as diazo component. According to the U. S. Patents Nos. 1,429,781 and 1,429,782 the use of N-substituted 4-nitraniline-2-sulphamides instead of 4-nitraniline-2-sulphonic acid affords an improvement of the dyeing properties of the azo-dyestuffs described in U. S. Patent No. 921,239 with respect to their fastness to fulling.

It has been found that not only the N-substituted sulphamides of the particular configuration of the above mentioned 4-nitraniline-2-sulphoalkyl-arylides yield with 2-amino-8-naphthol-6-sulphonic acid in acid solution valuable azo dyestuffs, but also any monoaminophenyl sulphamides of the general formula:

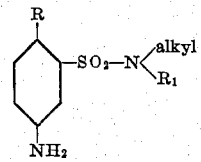

wherein R stands for hydrogen, alkyl or halogen, and wherein $R_1$ stands for phenyl or sulphophenyl.

The new dyestuffs in form of their dried and pulverized sodium salts constitute red powders dissolving in water with a yellowish red to a red coloration and in concentrated sulphuric acid with a red-violet coloration. They dye wool from acid baths clear yellowish red to red tints of an excellent fastness to light, perspiration and fulling and yield upon reduction a 4-aminobenzene-2-sulphamide and 1.2-diamino-8-naphthol-6-sulphonic acid.

In order to illustrate the invention, the following examples are given, the parts being by weight:

Example 1

290 parts of 4-amino-1-methylbenzene-2-sulphoethylanilide melting at 108° C. (obtain by the action of 4-nitro-1-methylbenzene-2-sulphonic chloride upon monoethylaniline and subsequent reduction) are diazotized in the usual manner. To the diazo solution thus obtained there is added a solution of 239 parts of 2-amino-8-naphthol-6-sulphonic acid in water containing an excess of sodium acetate. The dyestuff is worked up as usual and has in its free state the following formula:

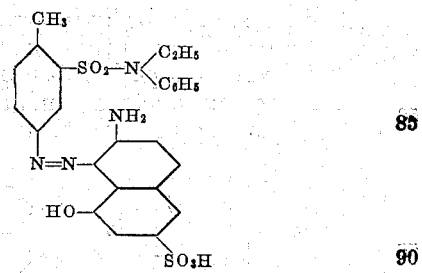

It constitutes in form of its dried and pulverized sodium salt a red powder dissolving in water, with a yellowish and in concentrated sulphuric acid with a reddish violet coloration. It dyes wool clear yellowish red tints of excellent fastness to light, perspiration and fulling and yields upon reduction 4-amino-1-methylbenzene-2-sulphoethylanilide and 1,2-diamino-8-naphthol-6-sulphonic acid.

Example 2

390 parts of 4-amino-1-chlorobenzene-2-sulphoethylanilide sulphonic acid (obtained by the action of 4-nitro-1-chlorobenzene-2-sulphonic chloride upon monoethylmetanilic acid in watery solution in presence of sodium acetate) are diazotized in the usual manner. The diazo solution thus obtained is then added to a solution of 239 parts of 2-amino-8-naphthol-6-sulphonic acid in water, containing an excess of sodium acetate. The dyestuff is salted out. It possesses in its free state the following formula:

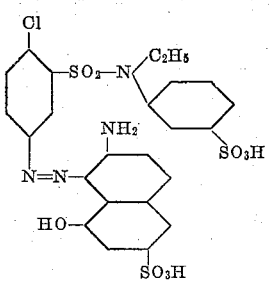

In form of its dried and pulverized sodium salt it constitutes a red powder, easily soluble in water with red color and dissolving in concentrated sulphuric acid with red violet coloration. It dyes wool clear red shades of excellent fastness to light and perspiration and yields upon reduction 4-amino-1-chlorobenzene-2-sulpho-ethylanilide sulphonic acid and 1,2-diamino-8-naphthol-6-sulphonic acid.

What we claim is:

1. A process for the manufacture of monoazo dyestuffs, consisting in coupling in an acid medium a diazotized 4-amino-benzene-2-sulphamide of the general formula:

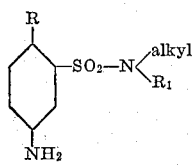

wherein R stands for hydrogen, alkyl or halogen, and $R_1$ for phenyl or sulphophenyl with 2-amino-8-naphthol-6-sulphonic acid.

2. As new products, the monoazo dyestuffs of the following general formula:

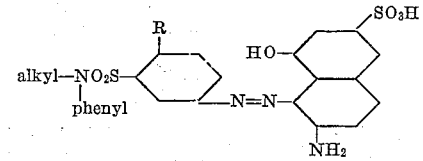

wherein R stands for hydrogen, alkyl or halogen, said dyestuffs constituting in the form of their sodium salts red powders soluble in water with a yellowish-red to red coloration and dissolving in concentrated sulphuric acid with a reddish violet coloration, yielding upon reduction a 4-amino-benzene-2-sulphamide and 1,2-diamino-8-naphthol-6-sulphonic acid, dyeing wool in an acid bath from yellowish red to red shades of excellent fastness to light, perspiration and fulling.

In witness whereof we have hereunto signed our names, this 30th day of April, 1929.

OSCAR KNECHT.
THEODOR WIRTH.